US012613815B2

(12) United States Patent
Gezelter

(10) Patent No.: US 12,613,815 B2
(45) Date of Patent: \*Apr. 28, 2026

(54) FAST MASS STORAGE ACCESS FOR DIGITAL COMPUTERS

(71) Applicant: Robert Gezelter, Flushing, NY (US)

(72) Inventor: Robert Gezelter, Flushing, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,107

(22) Filed: Dec. 19, 2024

(65) Prior Publication Data

US 2025/0315390 A1 Oct. 9, 2025

Related U.S. Application Data

(63) Continuation of application No. 18/526,870, filed on Dec. 1, 2023, now abandoned, which is a continuation of application No. 17/556,419, filed on Dec. 20, 2021, now Pat. No. 11,874,782, which is a continuation of application No. 16/518,861, filed on Jul. 22, 2019, now abandoned.

(60) Provisional application No. 62/701,299, filed on Jul. 20, 2018.

(51) Int. Cl.
*G06F 13/16* (2006.01)
*G06F 13/28* (2006.01)

(52) U.S. Cl.
CPC .......... *G06F 13/1668* (2013.01); *G06F 13/28* (2013.01)

(58) Field of Classification Search
CPC ............................. G06F 13/1668; G06F 13/28
See application file for complete search history.

(56) References Cited

U.S. PATENT DOCUMENTS

| | | | | |
|---|---|---|---|---|
| 7,478,205 B1 * | 1/2009 | Hwang | ................. | G06F 3/0659 |
| | | | | 711/163 |
| 8,612,711 B1 * | 12/2013 | Griffin | ................ | G06F 12/0806 |
| | | | | 710/3 |
| 2003/0206553 A1 * | 11/2003 | Surcouf | ............. | H04N 21/8455 |
| | | | | 370/428 |
| 2004/0059854 A1 * | 3/2004 | Hill | ..................... | G06F 13/1642 |
| | | | | 711/158 |
| 2008/0313363 A1 * | 12/2008 | Granit | ..................... | G06F 13/28 |
| | | | | 710/24 |
| 2014/0136808 A1 * | 5/2014 | Colgrove | ............ | G06F 12/0238 |
| | | | | 711/158 |
| 2015/0113182 A1 * | 4/2015 | Fallon | .................... | H04N 5/781 |
| | | | | 710/74 |
| 2015/0134857 A1 * | 5/2015 | Hahn | ...................... | G06F 3/061 |
| | | | | 710/5 |

OTHER PUBLICATIONS

Kenah. Lawrence J. & Bate, Simon F.; VAX/VMS Internals and Data Structures, Digital Equipment Corporation, 1984.

(Continued)

*Primary Examiner* — Harry Z Wang
(74) *Attorney, Agent, or Firm* — Sutton Magidoff Barkume LLP

(57) ABSTRACT

A system for increasing the speed and reducing the time to obtain a required amount of data, from a secondary storage device, for a digital computer, based upon measures to improve the time efficiency of I/O request processing by improving the timing and sequence of transfers to improve the efficiency of mass storage devices.

12 Claims, 17 Drawing Sheets

(56) References Cited

OTHER PUBLICATIONS

McCoy, Kirby; VMS File System Internals, Digital Equipment Corporation, 1990.

Gezelter, Robert, Re-architecting Mass Storage Input/Output for Performance and Efficiency,Dissertation in Computer Science, City University of New York 2018.

Hewlett-Packard Development Company, L.P.; HP OpenVMS I/O User's Reference Manual, 2005.

Hewlett-Packard Company; HP OpenVMS Programming Concepts Manual, vol. I, 2005.

Hewlett-Packard Company; HP OpenVMS Programming Concepts Manual, vol. II, 2005.

Hewlett-Packard Company; HP OpenVMS System Services Reference Manual: A-GETUAI, 2006.

Hewlett-Packard Company; HP OpenVMS System Services Reference Manual: GETUTC-Z, 2006.

Digital Equipment Corp., RSX-11 M/M-PLUS Executive Reference Manual, Order No. AA-H265A-TC, May 1979.

Digital Equipment Corp., RSX-11D Executive Reference Manual, Order No. DEC-11-OXERA-B-D, RSX-11D Version 6, May 1975.

Digital Equipemnt Corp., RT-11 Software Support Manual, DEC-11-ORPGA-B-D, Nov. 1973 Revised Jun. 1975.

* cited by examiner

Free

Full; Awaiting Processing

Free

| Event Flag/Channel |
| :---: |
| Function |
| *IOSB |
| *AST |
| AST Parameter |
| P1 |
| P2 |
| P3 |
| P4 |
| P5 |
| P6 |

*Fig 2*

| Forward Link | | |
|---|---|---|
| Backward Link | | |
| RMOD | TYPE | Size |
| Process ID | | |
| AST Address | | |
| AST Parameter | | |
| Window | | |
| UCB | | |
| Priority | Event Flag | Function |
| IOSB Address | | |
| STS | | Channel |
| SVAPTE | | |
| | | BOFF |
| BCNT | | |
| | | STS2 |
| IOST1 | | |
| IOST2 | | |
| ABCNT | | |
| OBCNT | | |
| SEGVBN | | |
| DIAGBUF | | |
| SEQNUM | | |
| EXTEND | | |
| ARB | | |
| KEYDESC | | |
| CDRP (72 bytes) | | |

Fig 3

Request0

| Event Flag/Channel |
| :---: |
| Function |
| *IOSB |
| *AST |
| AST Parameter |
| P1 |
| P2 |
| P3 |
| P4 |
| P5 |
| P6 |

Requestn

| Event Flag/Channel |
| :---: |
| Function |
| *IOSB |
| *AST |
| AST Parameter |
| P1 |
| P2 |
| P3 |
| P4 |
| P5 |
| P6 |

Fig 4

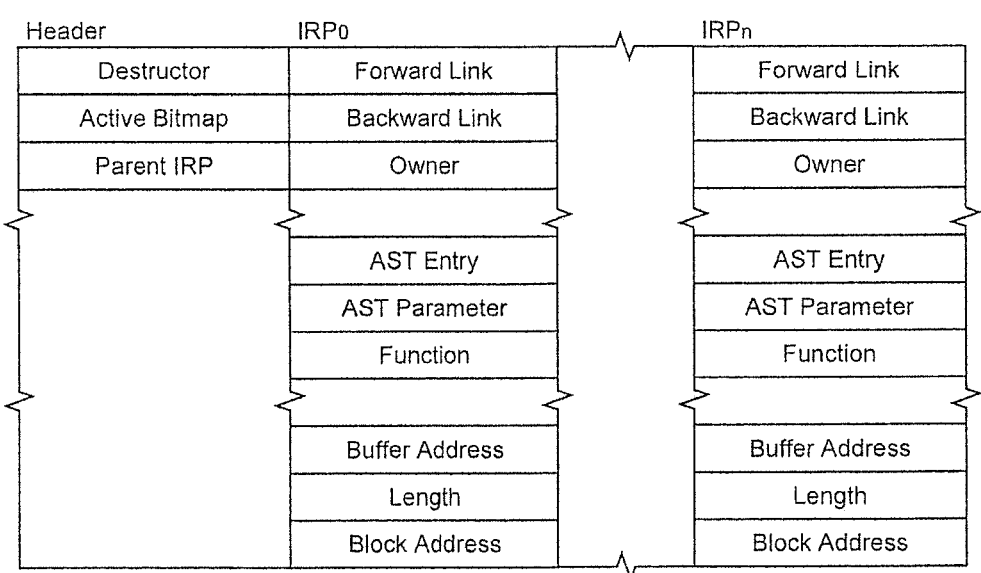
| Header | IRP0 | | IRPn |
|---|---|---|---|
| Destructor | Forward Link | | Forward Link |
| Active Bitmap | Backward Link | | Backward Link |
| Parent IRP | Owner | | Owner |
| | AST Entry | | AST Entry |
| | AST Parameter | | AST Parameter |
| | Function | | Function |
| | Buffer Address | | Buffer Address |
| | Length | | Length |
| | Block Address | | Block Address |

Directly Connected

Bus Connected

Switching Network

Fig 9

| 0 | 1 | 2 | 3 | 4 | | n-2 | n-1 |
|---|---|---|---|---|---|---|---|
| 0x1000 | 0x3000 | 0x4000 | -0x10000 | $\lambda$ | | $\lambda$ | 0x2000 |
| &Request 135 | &Request 931 | &Request 135 | &Request 90 | ? | | ? | &Request 231 |

Virtual Request Expansion

Create Transfer Map
from Queue

PRocess (oR execute)
TRANSfeR MaP

FAST MASS STORAGE ACCESS FOR DIGITAL COMPUTERS

BACKGROUND OF THE INVENTION

There have been many improvements in the performance of general-purpose computing systems. Such systems are composed of software including an operating system and the hardware including Central Processing Units (CPUs), CPU-related caches, and immediate random access memory (RAM), and secondary storage. Often, CPUs, CPU-related caches, and primary memories of such systems are contained within, or directly attached to a single printed circuit board, referred to as a "motherboard". With respect to the I/O system there have been fewer performance improvements. The CPU and its immediate RAM have radically improved speeds, i.e., by at least three orders of magnitude. However, I/O systems have improved far less than the increment in CPU speed, despite increases in transfer rates. As a result, there are many situations where the CPU is unproductive while it is waiting for data or information to be transferred to/from secondary storage.

The present invention is intended to greatly ameliorate the long-standing performance impediment when data is transferred between the main memory and secondary storage systems of a computer in either direction (to/from main memory). This invention is relevant to secondary, or mass, storage devices that are usually layered in modern systems; it is intended to improve efficiency by a balanced, efficient utilization of all layers of the system. In a modern system such secondary storage can include a variety of devices, such as random access storage, e.g., rotating magnetic or optical disks present in a device as an assembly of one or more stacked platters, with one or more read/write heads each, and sequential devices, e.g., linear magnetic tape transports, which include tape containing cartridges, recording in parallel, serpentine formats or combinations thereof.

A common exemplar of a sequential device is a magnetic tape transport.

A common exemplar of a directly addressable storage device is disk storage using a magnetically recordable disk(s) as a storage medium, where the disk(s) rotate in the device and the head assembly can move between different circular tracks of the platter assembly. A track is defined as the data locations available to a single head at a given position of the access arm, i.e., a specific radius from the center of the platter. The collection of tracks on different platters accessible at one position of the heads is referred to as a cylinder. The disks rotate in the device independent of access arm position. Other examples include so-called flash storage or solid-state storage. The characteristics of import are that the medium is directly-addressable, and unlike random access memory ("RAM"), the sequencing of requests can affect response performance. The medium may be rewritable, read-only, or writable-once (WORM).

Generally, random access mass storage, or secondary storage, devices are organized in multi-byte blocks, often referred to as "sectors". Originally, blocks on such devices were addressed using explicit cylinder, head, and "block within track"/"sector" addressing (CHS). Modern devices eschew such geometric specificity by using "logical block addresses" (hereafter "LBA"), beginning with zero and ascending to the highest numbered block on the medium. Such an LBA encapsulates, at least, the details of cylinder, track, and "block within the track" of the blocks stored on a medium within a disk storage device. In more complex cases the LBA may be fully divorced from physical implementation, being used instead as an index into an arbitrarily implemented storage facility.

The art has apparently failed to significantly improve the physical scheduling of the I/O requests, and the resulting performance problems; but has instead focused on improving CPU speed and the access time and size of random access memory attached to the CPU.

SUMMARY OF THE INVENTION

This invention relates to a system for increasing the speed and reducing the time to obtain a required amount of data, especially as stored on a storage medium, within a secondary storage device, for a digital computer. Such storage devices, unlike more limited capacity, random access memory devices, have inherent delays depending upon the physical location, as stored on the storage medium, of any given data requested. Rotating hard disks, magnetic tapes or other such devices which include both linear or single axis storage media, such as tape reels or tape cartridges, containing sequentially organized magnetically recordable media, and directly-addressable storage devices, such as the rotating hard disks, which have multiple axes of movement, e.g., radius and rotation, have inherent delays caused by the physics of linear or rotational movement. In the case of directly addressable storage devices these delays include rotation of the disk and movement of one or more heads over the disk surfaces. In accordance with the present invention, it has now been recognized, contrary to the long history of successful operation with the present system, that by making changes in request timing and sequencing, significant and substantial improvements in increasing the speed of reading/writing to the secondary storage media, by as much as an order of magnitude or more.

The present invention provides a system that greatly improves the speed of access to any amount of stored data on secondary storage devices, whether for linear drive products such as reels/cartridges of tape, or directly-addressable storage products such as rotating disks or solid-state storage, regardless of the storage device location. By referring to "storage" we exclude so-called main memory or RAM from the focus of this invention. The invention however is useful for both the classical von Neumann architecture type of computer system, as well as other system architectures, including the more modern modified Harvard system for accessing random access memory.

Secondary storage is logically or physically separate from RAM, and includes such linear or single-axis systems, such as reels/cartridges of tape, as well as multi-axis directly addressable storage systems, such as hard disk drives, optical disk drives and solid-state storage; all such devices are usually not directly accessible by the CPU. Such devices are slower than RAM but unlike RAM, are non-volatile, so as to retain the data content even when there is no power being applied. Secondary storage devices are physically distinct from the so-called RAM (which is directly addressable by the CPU).

The secondary storage devices are generally available through so-called input/output ("I/O") interfaces to access and transfer the desired data between the primary memory or RAM, and the secondary storage devices. The quantity of the data capable of being maintained in secondary storage, as compared to the primary storage or RAM, is often greater by at least two orders of magnitude. The I/O interface may contain a map or other mechanism which translates addresses used on the storage side of the I/O interface to actual primary storage addresses within main memory.

With respect to relative accessibility, hard disk drives tend to be the most accessible of the secondary storage systems, other than the now generally available, but far more costly, solid-state storage systems. However, for the largest secondary storage devices, disk drives are the device of choice. Accessing a particular location on the disk medium involves multiple axis positioning, involving the rotation of the disk medium and the positioning of the heads to the necessary cylinder on the disk platters in each device. The combination of these two movements brings the specified block under the recording head. Accessing data from secondary storage, such as a hard disk drive, typically takes several milliseconds to bring the data into the CPU. The time to access a byte of information stored in RAM is measured in nanoseconds, i.e. billionths of a second. Thus, the difference between RAM access time and secondary storage access time is approximately a factor of 100,000. With hard disk drives, generally, once a disk read/write head reaches the proper placement adjacent to the data of interest rotating under it, subsequent data in block form adjacent to the initial data point generally have a much lower access time as the movement of the head and the rotational latency of the medium tend to be the greatest delays in accessing secondary storage data. As an example, a disk platter containing 200 blocks/track rotating at 15,000 RPM completes a revolution in 4 milliseconds; each block correspondingly takes 20 microseconds to pass beneath the recording head. The rotational delay time (latency) required to start processing any particular block is, on average, ½ revolution or 2 milliseconds.

Generally, files residing on mass storage are referred to by a file name. The operating system provides a software facility to translate a file name to an ordered set of blocks on a mass storage volume(s), with each block identified by an LBA or equivalent. The blocks assigned to a file on a block-addressable random access storage device may be a contiguous group of addressable blocks on the block-addressable random access device, or as many as n ordered, discontiguous, discrete ranges of blocks on the block-addressable random access device. A block-addressable random access storage device may reflect a physical device and medium; or it may be a form of virtual device, which itself may be implemented on a file or similar construction. Such virtual devices may be nested to arbitrary depth. The term LBA (logical block address) refers to the block number within a device, but it does not imply a particular geometry of cylinders, tracks, and blocks within tracks.

Historically, each medium was a single volume. However, since before the advent of the PC, implementations have increasingly violated that original, simple concept. It was realized that a larger medium could present the appearance of several smaller devices, or vice versa, in a manner transparent to software, except for performance (e.g., a single access arm cannot be in two places at the same time in the case of a single physical device presenting the appearance of more than one smaller device). Such media has identifiable partitions, each with its own file system and associated metadata.

Today, systems implement conceptually similar mechanisms in a variety of ways, which may be nested one upon the other. Thus, a file may reside on a volume, the volume may reside on a virtual disk, the virtual disk may be a file within a different file system, which may be on a partition of a logical disk, which is realized with an LBA-addressable block store of arbitrary organization and implementation.

"Granularity" can also be significant. Granularity refers to the size of the smallest "chunk" of data that can be efficiently accessed as a single unit, e.g. without introducing additional latency. A possibly useful fourth attribute is "reliability", or the likelihood of a spontaneous bit value change depending upon the circumstances of the data transfer. That is a much less definite time and is more difficult to ascertain.

Buffers reside in Random Access Memory (RAM) in a host computer ("Host").

BRIEF DESCRIPTION OF DRAWINGS

The systems and improved algorithms for carrying out the computer operations of the present invention for accessing and transferring data between a mass storage system and a host computer are graphically shown in the following drawings:

FIG. 2 depicts the parameter list for a composite system call containing multiple potentially independent requests (FIG. 2) for transfers between storage device(s) and a host computer;

FIG. 3 depicts a classic I/O Request Packet (IRP) for a conventional single request per "system call" constructed from the parameters illustrated in FIG. 2;

FIG. 4 depicts the parameters for an I/O request to transfer a single buffer, specifying the function; completion/status information; and the variable parameters (P1-6), which specify the buffer address, transfer address, and block number of the first subject storage block;

FIG. 5 depicts another improvement of the present invention, a composite data structure, referred to as a "multi-packet", containing an administrative header and multiple I/O Request Packets (FIG. 3), thus reducing the allocation/deallocation operations and contention for the associated memory allocation/deallocation locks, a significant performance bottleneck;

FIG. 9 depicts the transfer mapping of blocks within a track/cylinder to transfer addresses in I/O address space, with provision (λ entries) for skipping blocks, that is conceptually circular, so that the starting point is irrelevant in accordance with the methodology of the present invention;

FIGS. 10-12 depict the algorithms for the allocation and deallocation of a multipacket and the individual request packets within a multipacket;

FIG. 13 depicts the flowchart for I/O request deferral in accordance with the present invention; enabling the batching of multiple buffers into a composite I/O system request (FIG. 4);

FIG. 14 depicts an algorithm depicting a method for achieving a virtual request expansion. It is particularly useful when used in conjunction with a multipacket (FIG. 5) and/or composite I/O requests (FIG. 4) and the related procedures illustrated in FIGS. 10-13;

FIG. 15 depicts the flowchart for a requested arrival at the terminal device and again is most effective when used in combination with FIGS. 10-14;

FIGS. 16 and 17 provide and describe the algorithms for creating a transfer map from the queue and then processing the transfer map, which again is especially effective.

DETAILED DESCRIPTION OF THE INVENTION

Figure 1:
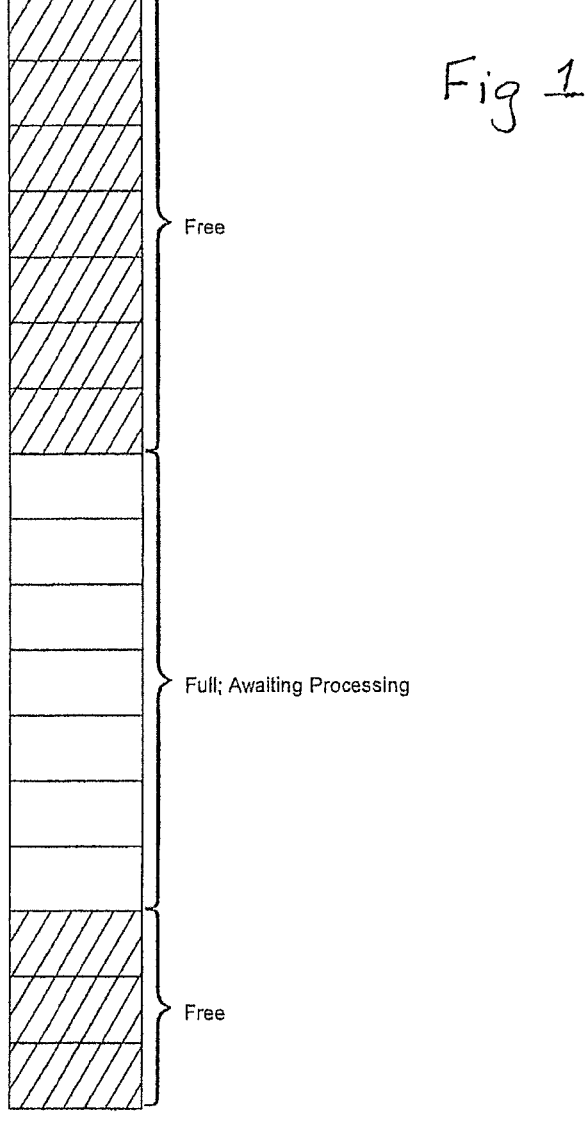
FIG. 1 depicts a pool of seventeen buffers, seven (7) of which contain data and ten (10) of which are empty. If writing, the write operations for the seven buffers containing issued.

In accordance with the present invention, a series of algorithms are used to improve the access time, regardless of the type of storage utilized, e.g., multi-axis disk drives, linear mono-axis tape drives or solid-state drives. All of these devices require 'latency' time to locate the space for maintaining the data as well as the 'transfer' time to read or write the data. The present invention can also be used whether the storage devices are physically connected to the CPU, for example by a solid electronic connection, such as a SCSI, ATA, or USB line, or whether the system is connected via a wired or wireless (Wi-Fi) network; further, the storage can be located physically close to the CPU or it can be located many miles away, for example, in the so-called "cloud".

For the purposes of this invention, a request (hereafter "Request") to transfer data to or from a mass storage device consists of:

a direction (read/write)
a starting memory address in storage memory
a starting LBA on the device
a length in blocks
a completion notification mechanism The actual carrying out of a Request, whether to read or write, is generally referred to as a "transfer".

Achieving high performance is not merely a question of device-level scheduling. Achieving high, if not maximal, device performance requires changes at higher levels that enable lower-level optimizations. These changes start with the issuance of I/O operations by user-level programs.

For sequential storage, the contents of RAM buffers are transferred between sequential storage and buffers, with the contents of each buffer generally producing a single physical record on the storage medium. Typically, there are a number of buffers available for use with each file. Conventionally, information is transferred to/from each buffer when possible, e.g. during read, information is transferred as soon as a buffer is free to receive it. This produces a surge in reads initially, subsequently spacing out the reads in time as buffers become available. The behavior for writes is analogous, except that buffers will be written as soon as they become available, so that there is no initial surge.

In accordance with the present invention, when a "no processable buffers" condition exists, suspend transfers until a backlog of buffers to be processed has accumulated (e.g., empty buffers for read processing; full buffers for write processing). Maximum device performance is achieved when device processing is deferred until enough buffers are available to maintain maximum device speed (this threshold is the "initiation threshold", a combination of minimum buffers and bytes). Failing that, the longest stretch of high performance is when all buffers are available for processing. When a sufficient number of processable buffers are available, initiate processing until the "no processable" buffers condition recurs. To simultaneously maximize processing and device performance, the condition is modified to initiate transfers when a near "full" condition occurs, e.g. with a pool of 20 buffers, start the transfer when 10 buffers become eligible, FIG. 2. Depending upon a variety of factors including CPU performance, system load, device contention, device performance, and application behavior, lower thresholds are appropriate. The largest percentage gain in efficiency is realized by the first increments in threshold, i.e., with a pool of 20 buffers, the largest gain is increasing the threshold from 1 to 2, the percentage gain from 19 to 20 is far smaller in most cases. This buffering regime improves the probability that a sequential medium transport will be able to sustain streaming operation. There are three possible cases:

Stream—The time between each successive data buffer is within the timing window permitted at the drive speed, thus the drive runs at its rated speed. (existent)

Average stream—Buffers are produced at varying times. Buffers are not written until a significant backlog has accumulated. The average time to produce a buffer is always sufficient to maintain streaming, although the production time for an individual buffer varies, with some being in excess of the time which would normally permit streaming. (part of this invention)

Start stop—Successive data buffers are produced at irregular intervals. Streaming is not possible. Drive operates slowly in start/stop mode. (existent)

In parallel, providing the size of the buffer backlog to the tape drive significantly improves the accuracy of decisions the drive may take with respect to the recording speed and reduces unnecessary media stalls.

An individual computer, which contains one or more processors (CPUs), runs a multitude of different applications and systems programs. As programs generate requests to access data within files stored on mass storage volumes, the operating system enters these requests into queues to allow presentation of these requests to the storage devices in an orderly fashion. Thus, the computer decides when each Request is sent to the storage device(s). The queue elements are generally referred to as I/O Request Packets (IRP), and completely describe the operation to be performed and the processing to occur when the operation is complete, FIG. 3.

User programs execute within a set of limitations, referred to as user mode, which prevent direct access to hardware, including I/O devices. Operating system components involved with device operation operate within a less restricted environment, often called kernel mode. System calls are used to convey requests from user programs operating in user mode to operating system components executing in kernel mode. Conventionally, one request is processed per system call, FIG. 4. In the case of requests for I/O, the request leads to the creation of a system data structure element that is processed by the various levels of the I/O software subsystem. IRPs are global data elements within a system. Thus, allocation of IRPs require the allocation of storage from a system-wide storage pool. Storage pool allocations require synchronization of related shared data elements (e.g., list heads, memory management structures) between the multiple CPUs in a multiprocessor system. Such synchronization is a well-known bottleneck on the performance of multiple CPU systems.

For sequential storage, in accordance with this invention, the writing/reading process is initiated when a user program requests that data in one or more buffers be transferred to/from the storage medium.

For direct access, or random access, storage, the process is initiated when a user program requests that one or more ranges of blocks within a file be transferred between buffers. (Each virtually contiguous range of blocks within a file is transferred into an individual buffer.)

For both types of storage, an improvement on the pre-existing state of the art is a Request that contains a number of sub-Requests, each of which represents a complete Request (completion notice, operation, buffer, LBA range), FIG. 5. The sub-Requests are entered into the queue in the sequence first to last, but without waiting for the preceding sub-request to complete processing. An implementor may choose to implement the request processing interface such that some elements of the sub-requests may be specified once as defaults and applied to all of the contained sub-requests (e.g., operation, file specifier, parts of completion processing). This Request containing multiple sub-Requests differs from the long-used concept of chained commands in that there is no sequencing implied to the sub-Requests, whereas command chaining implies sequencing of the individual command elements.

For directly addressable, or random access storage, as was noted previously, blocks assigned to a file may be either sequentially numbered or be a sequence of numbered blocks in a defined but arbitrary order. A device request can reference a single block or multiple blocks, but a single request must access contiguously numbered blocks on the device. Thus, a request for n consecutive blocks from within a file may generate between 1 and n requests for physical device transfers. By definition each of these requests will access an LBA-contiguous sub-range of the blocks requested from the file. All present operating systems examined will, starting at the first virtual block requested, serially retrieve contiguous sub-ranges of the requested blocks within the file, starting at the lowest virtually numbered block. Serially retrieving block ranges starting at the first virtual block of the request cannot provide optimal performance, as it presumes that the first block(s) are closest to the recording head.

Instead, generate a list of the required contiguous sub-ranges and issue an individual, separately schedulable operation for each of the sub-ranges, with the proviso that none of the operations can affect request scheduling until all of the requests have been received at the target device, subject to request queue capacity limitations at the target device. The sub-requests are transferred in a defined sequence, but without waiting for a proceeding sub-request to complete. This can occur at multiple levels, as a "device" may be virtualized; thus, what appears to be a file on a "disk" to a user-level program may actually be one or more discontiguous ranges of blocks within one or more different "files" on one or more different "disks".

Another embodiment of the present invention uses a multipacket, which is a single contiguous data structure located in system memory containing a header and multiple IRPs, FIG. 5. A multipacket is allocated in a single memory management operation. Once allocated, a dedicated lock (typically supported by a data structure within the multipacket header) is used to safely allocate/deallocate the IRPs within the multipacket. This increases performance by limiting contention for the multipacket-specific lock to the requests contained therein. If a single system request gives rise to multiple sub-requests, a multipacket can be used to package the requests, significantly reducing the contention inherent in the allocation/deallocation of multiple individual IRPs. Since each IRP contained within the multipacket is a complete IRP; there is no change to the semantics of an IRP. Thus, all lower levels of the I/O processing hierarchy are preserved. The only change required is during IRP completion processing.

When an IRP contained within a multipacket is completed, the multipacket header contains a pointer to a routine which implements a replacement for the standard single IRP destructor function. A multipacket is also suitable when a single I/O request for a virtually contiguous group of blocks within a file actually refers to a discontiguous set of LBAs on the underlying volume.

Requests and sub-requests specify a starting memory address, one or more strides, and a length. The stride consists of one or more overflow specifiers and coefficients. The overflow specifier may take a number of functionally equivalent forms, two examples of which are an index and a bitmap. As an example, the index 9 would be a shorthand for $2^{**}9$, which is 512.The equivalent bitmap would (in 32 bit hexadecimal) be 0x0200. The simplest form of coefficient would be addition of a constant, although more complex single or multiple stage processing is possible. Thus, incrementing a memory address can yield offsets 0, . . . , 510, 1024, . . . , 1534, etc. Such a sequence allows for an efficient implementation of striping and other multiple-medium applications.

Another embodiment of the present invention provides that a request may include a Buffer ID in place of a buffer address. A Buffer ID is a number which is distinguishable from a valid address, e.g., an odd value where aligned addresses are otherwise required. Alternatively, a separate field or a distinguishable function code could be used. At a later point, when a transfer is imminent, a message will be sent from the terminal node to the host node requesting that the I/O bus address of the memory location associated with that Buffer ID be identified. The host node responds with a message associating the particular Buffer ID with a specific I/O bus address. In this context, a "host node" may be a CPU or it may be an intermediate node in the network. Later, when the transfer has completed, a message is sent from the device to the host releasing the mapping associated with the Buffer ID. A completion message for a given request implicitly releases any associated Buffer ID/Address mappings, FIG. 7.

Figure 6:
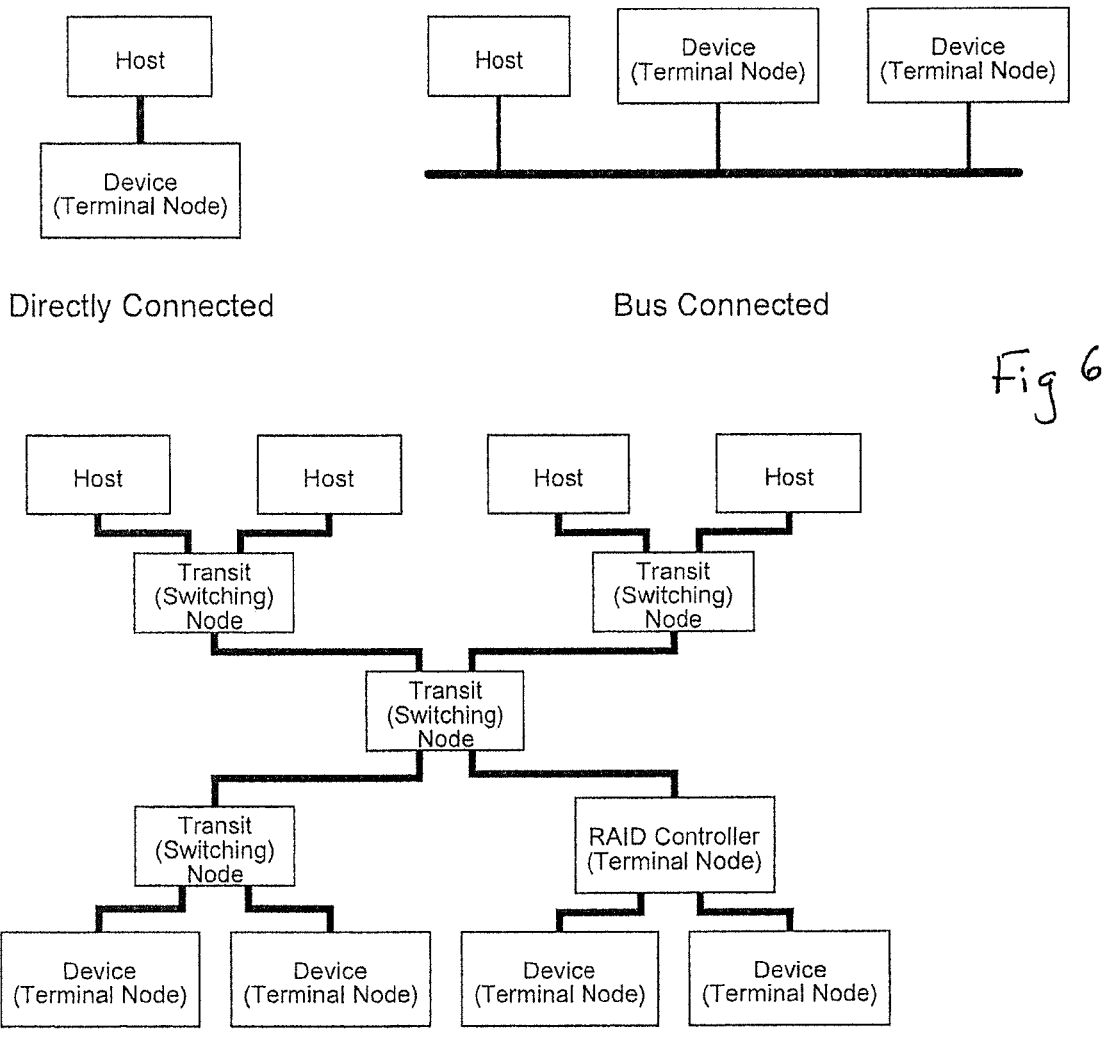
FIG. 6 depicts three basic examples of interconnection networks compatible with the methodology of the present invention; (A) depicts a simple network including a single host and a single terminal of that are directly connected; (B) depicts a network including a single host CPU and a plurality of terminal nodes connected to the host by a bus; and (C) depicts a switching network including a plurality of host CPUs each connected to a plurality of terminal nodes via a switching network.

Host is connected to the target device by a network. The network may be a direct connection between the Host and the target device, or it may be some form of communications network, FIG. 6. The only requirement is that the network guarantee delivery and is order-preserving. Requests entered into the network must be delivered to the target device and the requests must also be delivered to the target device in the order in which they are entered into the network. The preservation of order guarantees that the message with the "end of group" indicator is preceded by the other messages in the same group. Requests with different group identifiers, from the same or different Hosts, may be interspersed at the target device.

Before transmission over the network, each request in a group is tagged with a group identifier. The last request in a sequence, or group, is also tagged with an indicator that it is the last request of the specified group.

The network has host nodes (which originate requests), transit nodes (which route requests) and terminal nodes (which process requests). A terminal node may be a device that processes requests directly (e.g., a storage device), or it may take incoming requests and use them to generate additional request streams which are then inserted into the network for further processing. While every originating node must have a communications pathway to each terminal node referenced, there is no requirement that all originating nodes have access to all terminal nodes.

A request arriving at a terminal node which is a physical storage device will generate a series of work elements which can be appropriately scheduled. For a simple rotating disk, this means that each work element only refers to blocks within a specific track. Each work element contains information which identifies the request that caused its creation. For an archival storage library, each subdivided work element would refer to blocks on a specific track on a specific volume. For a solid-state memory, each subdivided work element would refer to a single bank. The sub-divided work elements are then entered into queues for each schedulable entity (e.g., cylinder, bank), FIG. 8. An example of a terminal node which is not a device node would be a RAID controller or a de-duplicating storage controller. In both cases, they proffer a "device" which is implemented by other physical devices. The physical devices may be directly connected, or they may be provided by terminal nodes lower in the network hierarchy.

Each terminal node thus stores the received requests and their breakdown into schedulable segments, queued in a manner to facilitate scheduling, FIG. 9. For rotating media disks with moving access arms, queueing by cylinder is appropriate. For solid-state storage, queueing by bank would be appropriate.

In accordance with the present invention, the drawings of FIGS. 10-17 set forth flow charts for a series of related or independent processes for carrying out the present inventions, to achieve the desired improvement in speed and efficiency.

Figure 10:
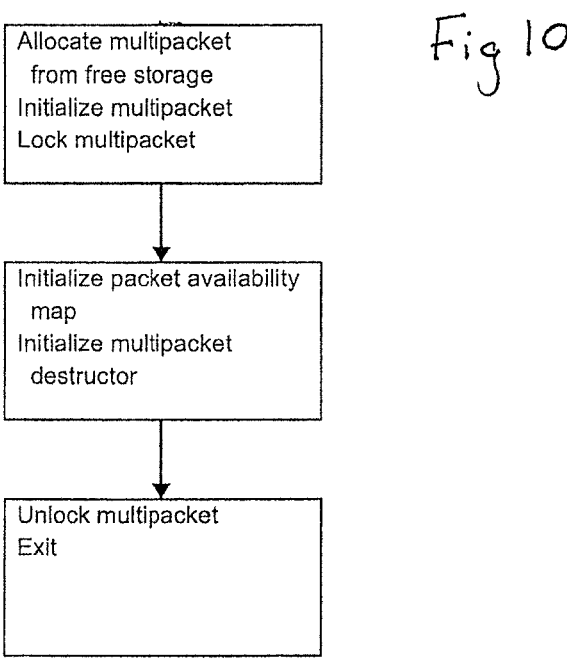
FIGS. 10-17 depict a series of flowcharts for a series of related or independent processes for carrying out the present invention.
Figure 11:
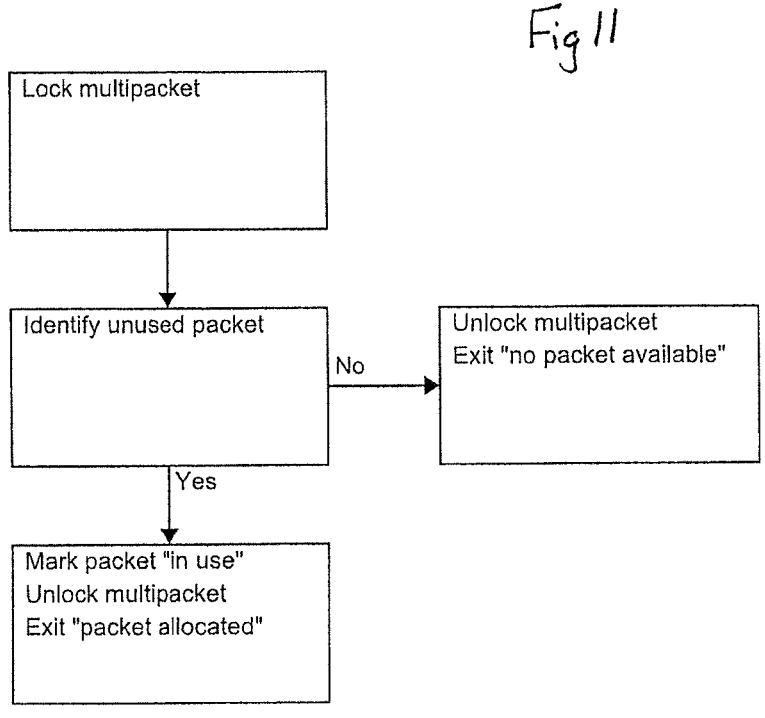
Figure 12:
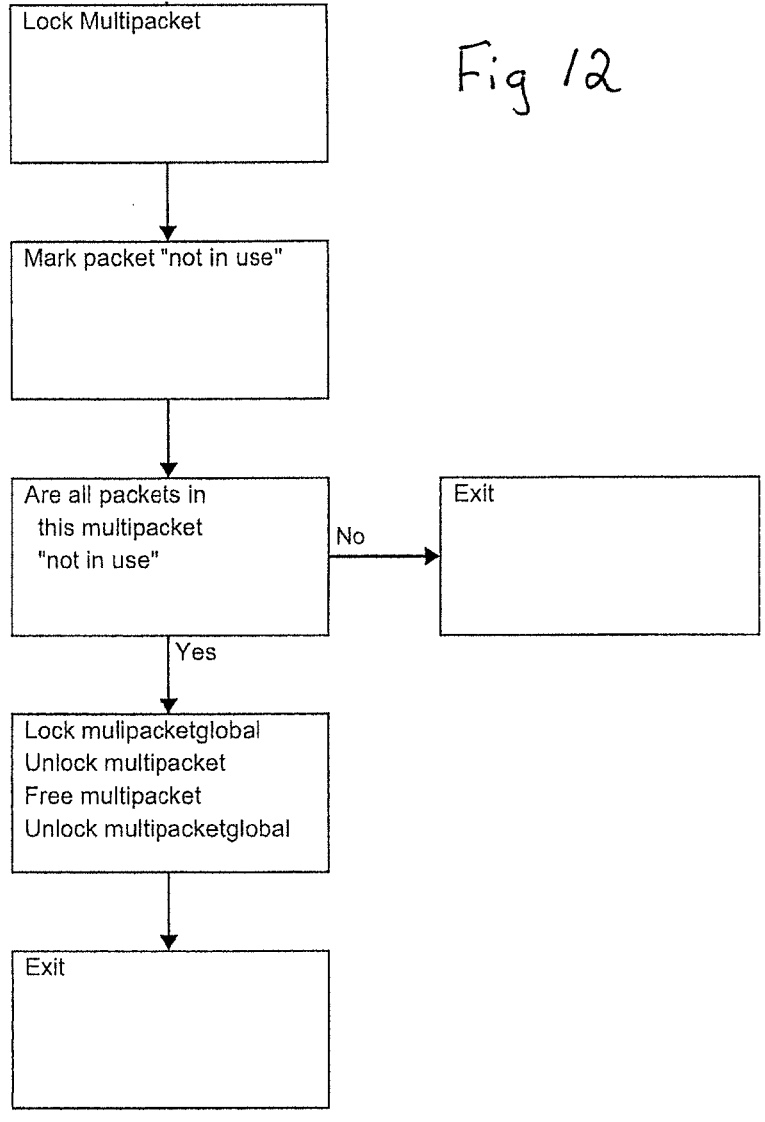

As set forth in FIGS. 10, 11 and 12, there is depicted the algorithm for the allocation of a multi-packet, the allocation of the individual packets within the multi-packet, and the deallocation of the packets within a multi-packet, respectively, are defined, and by themselves provide a highly effective and significant improvement over the prior arts.

Figure 13:
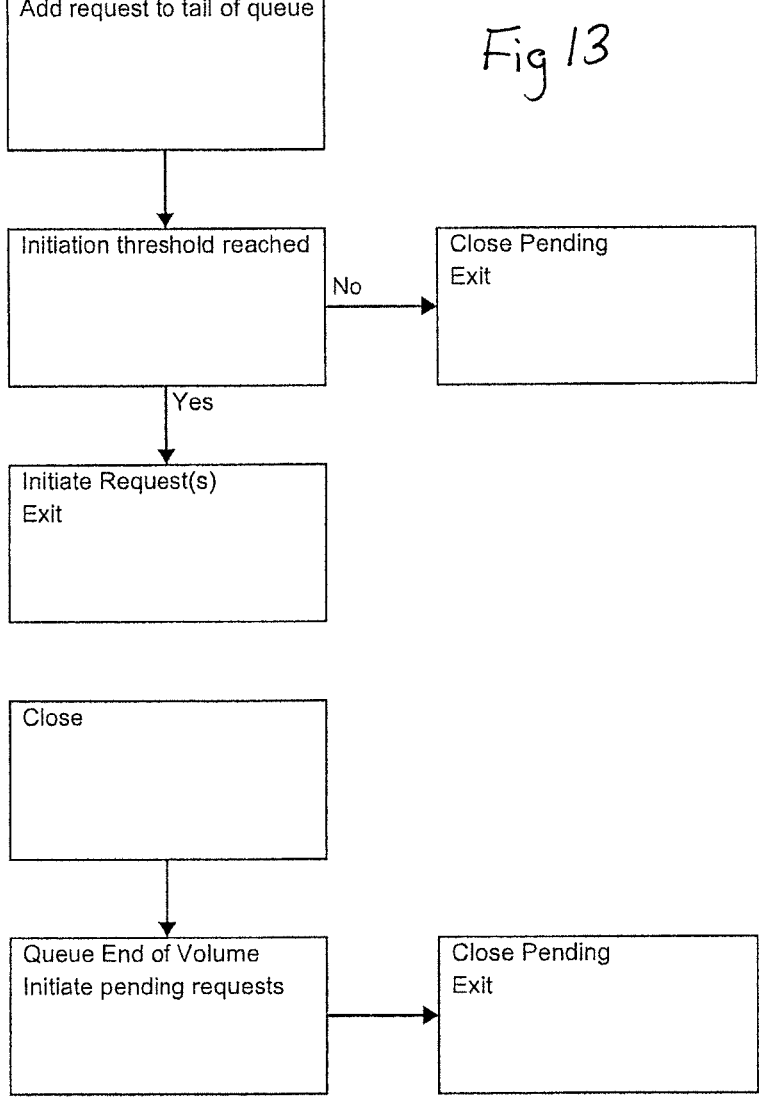

FIG. 13 shows the flowchart for an I/O request deferral in accordance with the present invention this procedure can be used as a standalone improvement to the present systems or in a more preferred embodiment is used in combination with the procedures in FIGS. 10-12.

Figure 14:
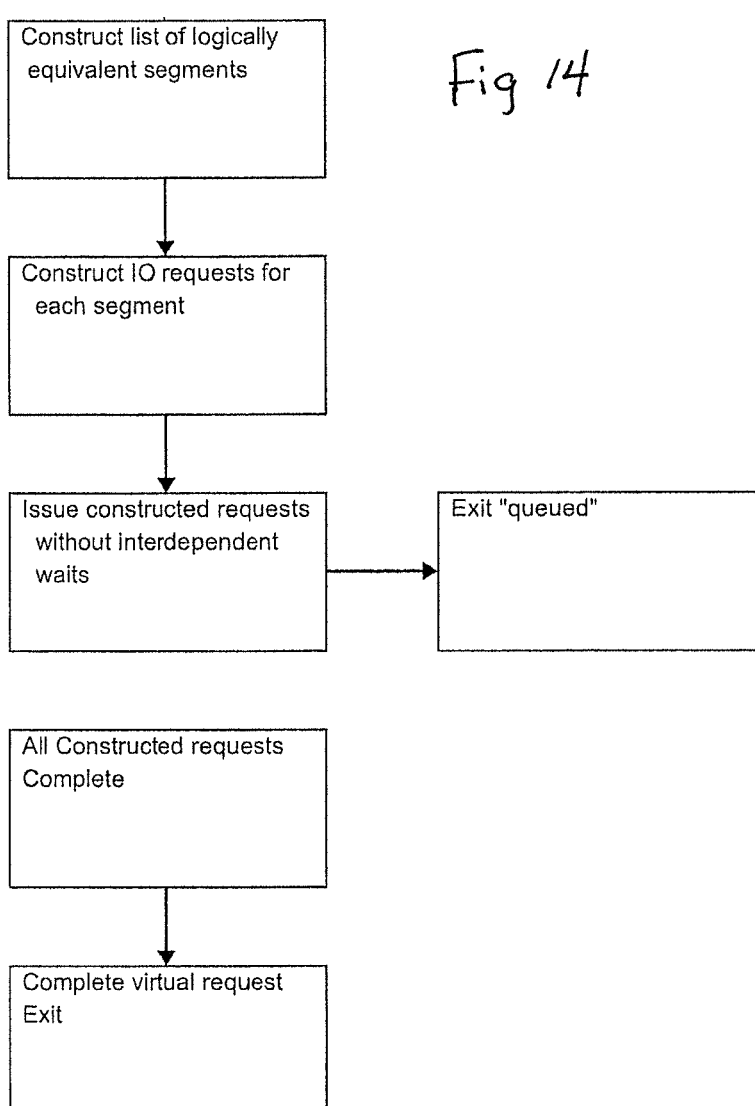

Describing the method for achieving a virtual request expansion, by the flow chart of FIG. 14, is itself useful in improving presently available systems, but again is more effective when used in combination with the algorithm depicted in FIG. 13, and is even more effective when both of these algorithms are used in combination with the procedure depicted by FIGS. 10-12.

Figure 15:
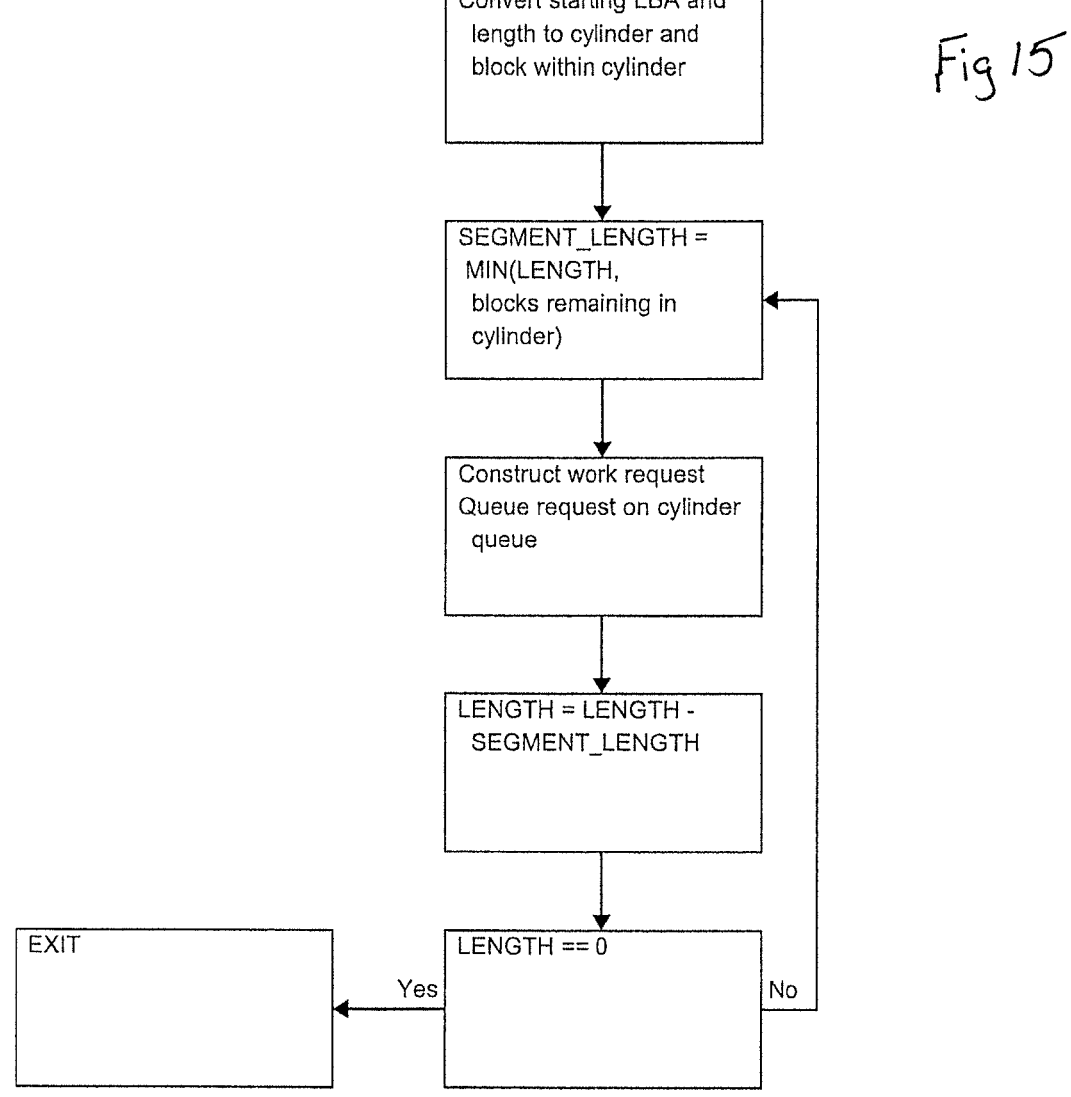

FIG. 15 shows the flowchart for a requested arrival at the device, and further improves the operation of each of FIGS. 10-12 or FIG. 13 or FIG. 14, but again is most useful when all are combined into a single combined procedure.

Figure 16:
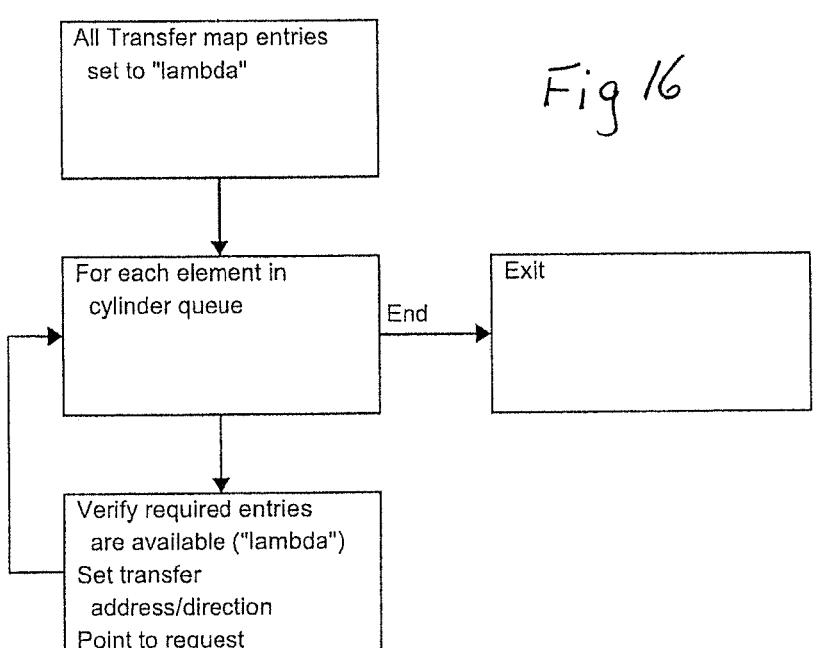
Figure 17:
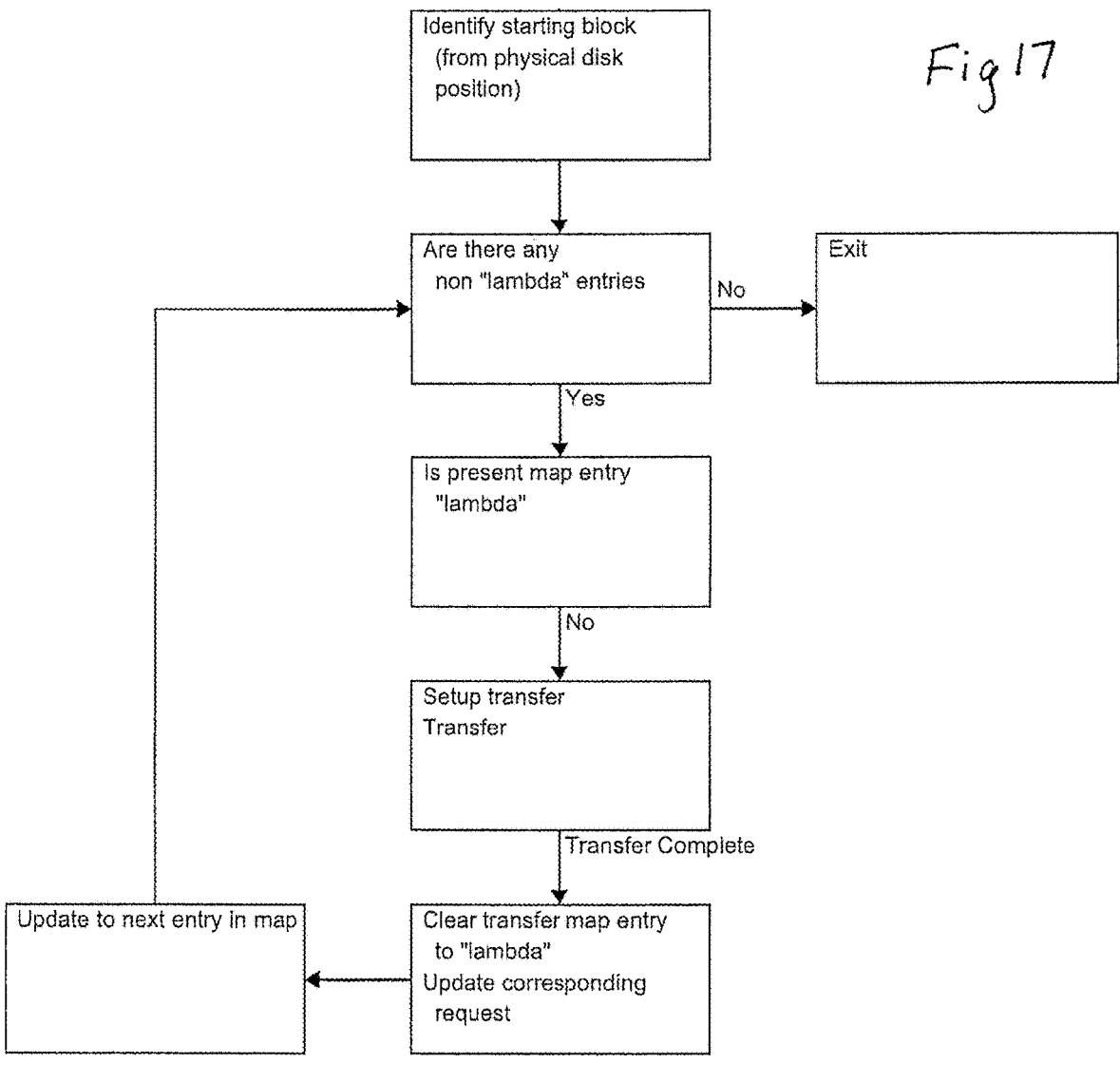

The two flowcharts of FIGS. 16 and 17 describe creating a transfer map from the queue and then processing, or executing, the transfer map so as to achieve a further significant improvement in speed of operation and efficiency. As before, this combination of methods in these two flowcharts can be used by itself in improving the systems as presently used, but again results in a great improvement when used in combination with all of the preceding flowcharts.

The following discussions are in the context of a computer system connected to one or more storage devices. The connection may be direct, or it may be through a network of some form, with intermediate switching nodes, for example, to so-called "cloud" storage. The only requirement is that within a transmission group, the order that requests are transmitted is preserved. If a computer system generates a group of two requests to a particular storage device, the requests will arrive at the storage device in the same order in which they were sent, ensuring that the "end group" indicator is preceded by the other messages in the group. This requirement has no impact on the relative positioning of different message groups. This is not to say that the requests complete in the same sequence, merely that sequence is preserved during transport. Without loss of generality, more than one computer system may be connected to a network, and more than one storage device may be connected to the network.

In the following examples, the processing of two 10-block reads from a file will be used. The portion of the file being read is not contiguous, the first being contained in blocks 1000-1004 and 2005-2009 of a particular volume; the second being contained in blocks 2520-2524 and 1900-1904 of the same volume.

In a further embodiment of this invention, the user program requests two 10-block reads from the file using a single system request that specifies two operations, FIG. 4. This request generates two IRPs for processing. The file system has already retrieved the metadata and determines that each of the 10-block requests is itself composed of two five-block, discontiguous segments. The file system then allocates multiple IRPs, preferably in a composite data structure (FIG. 5) and converts each of the 10-block reads into two five-block reads for each contiguous block range on the volume.

Issuing all segments of a multi-segment request at the same time optimizes efficiency. The host computer is not in possession of reliable information as to the optimal sequence in which to process the segments. Only the actual device has sufficiently accurate information to produce efficient sequencing.

While this scheme transfers blocks of requests from the computer system to the device, there remains a version of the von Neumann bottleneck. As a block of requests is transferred, there is a time where one or more of the requests have arrived but others have not. It is necessary to defer active scheduling of requests until all members of the block have arrived and undergone all processing needed to be eligible for read or write processing.

Figure 8:
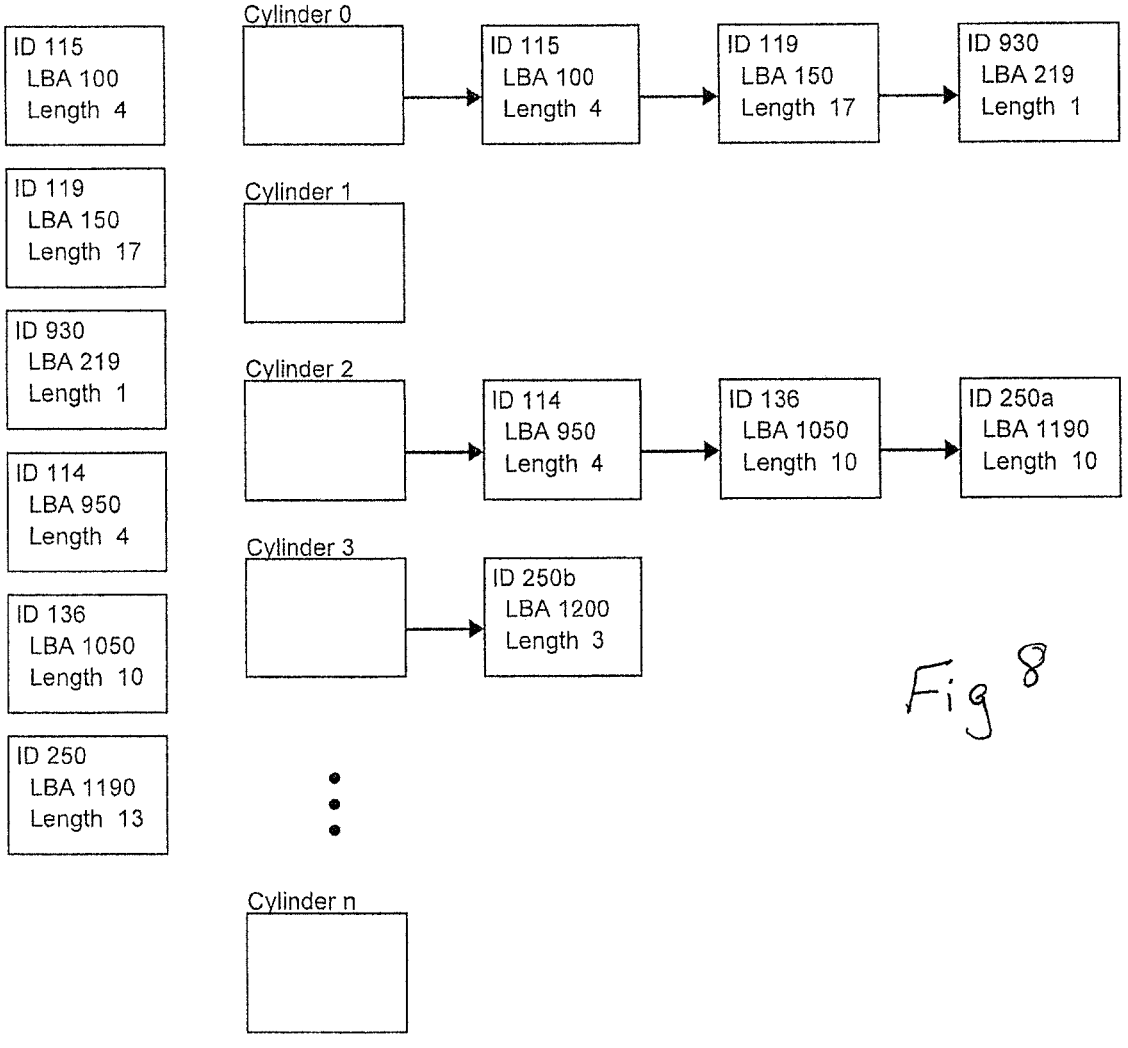
FIG. 8 depicts the methodology of the present invention where requests arriving from a Requestor(s) are divided into work elements, where the block(s) referenced by each work element are contained within a natural grouping (e.g., cylinder, in the case of moving-arm rotating storage) and queued separately for processing.

An example of a rotating storage disk with 1,000 cylinders, with each cylinder having four tracks or 100 blocks/sectors is illustrative, FIG. 8. A single Request is received (FIG. 8, leftmost column, Request ID 250) for 13 blocks starting at LBA 1190. This Request spans two different cylinders, Cylinder 2 and Cylinder 3. It thus produces two separately queued request elements, request elements with IDs 250a and 250b.

The first of these two request elements reference blocks on cylinder 2 (ID 250a). The second request element reference blocks on cylinder 3 (ID 250b). If the access arm is presently located on cylinder 3, acting on request element ID 250a, before request element ID 250b is enqueued, two seeks will be required. If request element ID 250a is appropriately marked as the first of a related group, it will be deferred until the other members of the group have been enqueued. If the request can be satisfied without active action (e.g., a third request from a different source results in a repositioning), it can be processed before the second request arrives.

In another embodiment of this invention, each of the two five-block expanded requests will then be transmitted to the mass storage device, with a group identifier. The second of the two requests ends the group and will be so marked (FIG. 8, leftmost column, Request IDs 930,114, and 136). To avoid sub-optimal scheduling, a Request within a group cannot be considered for scheduling arm movement until the entire group of which it is a part has been transmitted from the host to the device (this is to address the von Neumann bottleneck). Otherwise, a request later in the group could apply to the present, or closer, cylinder, processing of which would be more efficient. That is not to say that the issuing order is random; the order of issuance is defined from the first listed operation to the last, without implicit waits for completion.

When an access arm for a rotating media device is about to be positioned to a particular cylinder, construct a transfer map from the queued work elements for that cylinder, FIG. 9. A transfer map contains an entry for each block in the cylinder. Each transfer map entry contains at least three elements: a target transfer address, a direction, and a value which identifies the request which created the work element which is the source of the transfer. Depending upon the implementation, the direction may be combined with the address (e.g., using negative addresses to indicate direction). A special value or flag, referred to as "lambda" indicates that no transfer applies to that block. The implementor may also elect to use separate read and write maps, or a combined read/write map. If two pending read operations reference the same block, steps must be taken to ensure that both requests are satisfied. There are a variety of ways to ensure processing, including internal device buffers which are then transferred repeatedly and request deferral (multiple writes to the same block would represent an error). Depending upon the design of the storage device, interspersed reading and writing may or may not be possible. All such variations are functionally equivalent.

The transfer map allows transfers to start at any block in the medium rotation, with the appropriate transfer map entry synchronized with the rotational position of the physical medium. When a block has been transferred, the length field in the associated request is decremented, the partial result code for that partial transfer is included in the aggregate result field of the associated request, and the transfer map entry is set to lambda (cleared), indicating that the transfer is no longer pending. When all entries are set to lambda, or the first sector processed is reached, the cylinder is completely processed. Processing of the different tracks can be permuted, so long as all tracks in the cylinder are processed.

When the transfer map contains only lambda entries, the work queue for the cylinder is empty. The implementation of the transfer map is such that it is simply accessed with minimum code execution (e.g., in an interrupt service routine in the microprocessor attached to the physical drive; or in dedicated logic attached to the drive). While not necessary, the implementation of the transfer map may improve performance by including a summary count of active entries within a map header.

When the length field in a request reaches zero, all the sub-components of that request have been transferred. The accumulated request-result is then sent back over the network to the request originator, with the aggregated completion code of the component sub-operations. The aggregated completion code is computed by returning the most severe completion code encountered. Thus, if a request is segmented into three sub-operations with the sub-operations returning "OK", "OK", and "Bad Block" respectively, the aggregated result is "Bad Block". A successful completion has the lowest rank/precedence; thus "OK" can only be returned if all of the component sub-operations return OK.

With respect to the request-result, it is critical that the implementation take steps to ensure that the request-result does not reach the originator before such time as the last memory locations have been transferred. The "order preserving" requirement for the interconnection network is required to ensure this requirement. Completion before data transfer completion would release mappings and other underpinnings of the data transfer before the data transfer has been completed. To do otherwise would be to allow for the possibility of corrupted memory contents, including system corruption, which is unacceptable.

In another embodiment of this invention, upon receipt at the mass storage device, the device controller will subdivide each received Request into sub-Requests, where each sub-Request will only affect blocks which are located within a single track. As an example, FIG. 8, Request ID 250 (Left column, bottom) is split into queue elements with IDs 250a and 250b, with each queue element describing the requested area on cylinders 2 and 3, respectively.

In another embodiment of this invention, these sub-Requests will then be queued by cylinder, with each cylinder having its own queue, FIG. 8. When a cylinder is selected for processing, the individual cylinder queue will be converted into a Transfer Map (FIG. 9) where each entry in said Transfer Map contains the identity of the originating sub-Request and one of three values: "Do not transfer" (referred to as "lambda"); "Read block"; and "Write block".

In yet another embodiment of this invention, the Transfer Map allows transfers to be scheduled based upon the current position of the physical medium. This minimizes the rotational delay when scheduling transfers by permuting the requested transfers into the order of physical position on the medium. As each block is transferred, the Transfer Map is updated as is the relevant sub-Request to reflect the partial transfer. When all of the sub-Requests have completed, the associated Request has completed. Normally, storage addresses within a Request increment one memory word at a time.

In yet another embodiment of this invention, requests shall include one or more Block Stride and Overflow Mask pairs. For example, setting the overflow mask to 512 and the Block Stride to 512 would mean that a transfer would skip alternating blocks (which would allow the direct implementation of RAID 0, otherwise known as "disk striping").

Clearly, the division of Requests to sub-Requests does not presume that all of the sub-Requests affect LBAs on the same physical medium.

Buffer management is also critical to performance. Traditionally, as soon as a buffer is available for a transfer (read/write), a transfer is initiated. This has a drawback, as successive requests to a file/device are separated by time.

Separating related requests over time is not efficient. On shared devices, requests to the same file are likely accessing nearby, if not physically adjacent locations on the media. Interspersing unrelated requests referencing different locations on the media increases the amount of arm movement. Grouping related requests into short time intervals thus reduces repositioning operations and increases performance.

I/O requests made by running user programs express buffer addresses in the virtual address space of the requesting program. Processor physical memory is divided into fixed size "page frames". Virtual addresses used by programs can be considered as containing two portions: a high-order section which identifies a "page", and a low-order section which identifies an offset within a page. Translating a virtual address to a physical address involves using the "page" as an index into a table of page frame numbers (generally referred to as a "page table") and combining the resulting page frame number with the offset within a page to generate a physical address. As a result, it is quite possible that data items residing in adjacent virtual addresses may not be physically adjacent in memory as their page numbers may point to non-adjacent physical page frames.

I/O busses have a similar need to translate between I/O bus addresses and physical memory addresses. Each transfer must be contiguous in I/O bus address space. The pages referenced in main memory by an I/O transfer may be non-contiguous, thus each pending transfer requires one or more "pages" of I/O bus address space. The precise number of I/O bus address pages required depends upon the size of the "page" and the length of the transfer. The translations are stored in some form of mapping array or I/O page table. Such mapping facilities often have limits.

The large number of pending requests envisioned can create a shortage of address space on the I/O transfer bus. Traditionally, the mapping between I/O transfer space and host memory is determined before an operation is initiated. With enough potential transfers pending, the aggregate volume of mapped addresses can exceed the total address space available in the I/O bus address space.

In yet another embodiment of this invention, instead of I/O bus addresses, allow requests to include either I/O bus addresses or buffer identifiers. Establish a reverse channel from each device to the host, allowing the device to manage the mapping in I/O transfer space of its transfers. Thus, mapping can be established for only the particular set of transfers active or imminent (e.g., those on the same or nearby cylinders) at a time.

Figure 7:
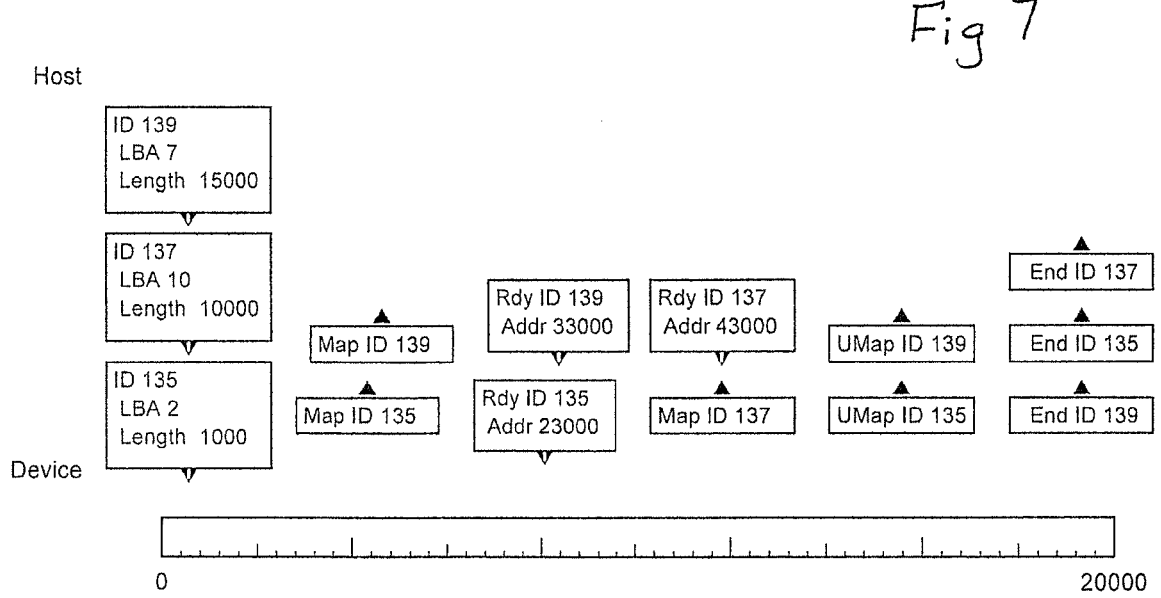
FIG. 7 depicts an example of a suitable dialogue supporting deferred mapping of Buffer IDs in accordance with the methodology of the present invention; Incoming request ID 137(leftmost column) generates a request to map the associated buffer at time 12000, the mapping is released implicitly by the End ID 137 at time 20000.

The mapping and un-mapping dialogue on the host end can be implemented by a simple automaton using a lookup table with entries inserted or removed as needed, FIG. 7. On dedicated devices (e.g., streaming tape), there is a related phenomenon. Streaming tapes place a high premium on a steady data flow to maintain performance. Shortfalls of data generate a very large performance penalty. (Missing a data block initiates a multi-second repositioning cycle.) This penalty reduces the performance of a 100 inch/second drive to an effective speed of fractional inch/second.

Once a streaming tape drive has stopped, there is a significant benefit to not restarting the drive as soon as the first data buffer is available. Rather, it is beneficial to defer initiation until a significant number of buffers are available for transfer, FIG. 1. This insulates drive performance from variations in the production rate of individual buffers, whether it is caused internally by program operation, or by external realities of system behavior.

Foregoing the immediate processing of a buffer, it is possible to write out/read in a group of buffers when a certain threshold is reached. In this example, a buffer pool containing 17 buffers has accumulated 10 free buffers, and a block of 10 read requests can be issued to the file, FIG. 1.

This has the effect of concentrating requests to each particular file within a narrow time window. Such concentrated bursts of activity are more amenable to optimization.

Many of the techniques described above are independent of each other. A particular system may implement one or more individual techniques and may not implement others. Some can be implemented at various points in the system hierarchy (e.g., request segmentation). Others (e.g., transfer maps) are more suitable at the device level; while others are relevant to host systems only (e.g., multi-request issuance). In some cases (e.g., request segmentation), the segmentation operation may occur at multiple points in the I/O hierarchy.

The following table summarizes the several elements forming the present invention for improving the overall speed of reading or writing data from or to secondary storage.

Fig.

A All Multiple I/O Requests/system call

B Direct Simultaneously active operations to segments I/O

C Direct Operations do not cross track or cylinder boundaries

D Direct Transfer Map

E Direct Stride (one or more strides)

F Sequential Deferred Start to preserve streaming

G Sequential Transmit backlog information to transport

H Direct Deferred start for grouping

I Direct Deferred mapping of memory buffers in IO bus space

J All Multiple requests within a larger structure

Each of the above elements, A through J, can be utilized individually for making some improvement over the prior system for transferring requests from the CPU-attached primary memory to secondary storage. The middle column (All, Direct, Sequential) indicates the categories of devices for which each optimization element is appropriate. Elements A and J in the table are each useful independently and can be used for making requests for either directly-addressable, random access mass storage or for sequential, i.e. linear, storage. Those that are described as "direct" are best used for directly-addressable mass storage rather than sequential storage. Thus, B, C, D, E, H, and I can each be used individually but are preferably used in combination. All of them can be used together, with A and J for achieving the greatest improvement compared to what is presently used for accessing directly-addressable storage. Otherwise combinations of two or more of B, C, D, E, H and I can be used. For example, one such combination is C (no implied seek) and D (Transfer Map), combining the "no implied seek" with "transfer map" usage.

Similarly, D and E are useful together as are H and I. Indeed, substantially any combination of these elements is useful. The more that are combined the increasingly greater will be the improvement over the present systems in use. Indeed, the combinations create synergistic improvements; when at least two are used together improvements that are far greater than when either one is used alone.

A and J are independent and apply to both Sequential and Directly Addressable storage.

B, C, D, E H, and I apply to Directly Addressable storage. While they do benefit from synergistic effects (e.g., C makes D easier/faster to compute), it is possible to implement one without the other. Thus, there are 63 possible combinations which are advantageous, although the more features are used, the greater the total benefit.

Similarly, F and G apply to Sequential storage but are otherwise independent. Thus, F and G are each independently useful, as is a system using both F and G.

With the foregoing disclosure in mind, it is believed that various other combinations of individual elements for improving the overall speed of reading or writing data between a primary memory and secondary storage in accordance with the principles of this application, will become apparent to those skilled in the art, including the use of many conventional steps and components that are or shall become well-known and would be useful in carrying out the present invention without themselves being a part of the invention. The scope of this invention is to be determined only in accordance with the scope of the following claims.

The invention claimed is:

1. A computing system comprising:
a CPU;
random access primary memory (RAM) accessible to the CPU;
a program executing on the CPU;
a buffer consisting of consecutive random access primary memory locations directly accessible via CPU instructions;
a secondary storage device comprising one or more mass storage devices;
an I/O Interface providing a transfer mechanism between the random access primary memory and the secondary storage device;
a mass storage transfer request includes direction, (to/from RAM), a starting address in primary memory, a starting mass storage block number, and a block count;
a controller configured to accept mass storage transfer requests from the I/O interface and control the secondary storage device; and
an operating system configured to initiate data transfers between buffers located in random access primary memory to/from the secondary storage device;
one or more device drivers that translate program-issued operating system I/O requests into controller requests transferred via the I/O interface to the controller wherein:
a program invokes an operating system service to enqueue a program request to initiate mass storage transfer requests between program buffers and the secondary mass storage device;
one or more mass storage devices comprise a sequential mass storage device;
at least one of the device drivers delays communication of the I/O transfer request until a specified backlog threshold measured in records and/or bytes has been reached;
the controller receives backlog data bytes and record count from the device driver.

2. The system of claim 1 where the sequential device selects media movement speed based upon the backlog data received from the device driver.

3. A computing system comprising:
a CPU;
random access primary memory (RAM) accessible to the CPU;
a program executing on the CPU;
a buffer consisting of consecutive random access primary memory locations directly accessible via CPU instructions;
a secondary storage device comprising one or more mass storage devices;

an I/O Interface providing a transfer mechanism between the random access primary memory and the secondary storage device;
a mass storage transfer request includes direction, (to/from RAM), a starting address in primary memory, a starting mass storage block number, and a block count;
a controller configured to accept mass storage transfer requests from the I/O interface and control the secondary storage device; and
an operating system configured to initiate data transfers between buffers located in random access primary memory to/from and the secondary storage device;
the one or more mass storage devices comprise a random access mass storage device wherein:
a program invokes an operating system service to enqueue a program request to initiate mass storage transfer requests between program buffers and the secondary mass storage device,
each request for consecutive blocks within a file is expanded into one or more sub-requests for consecutive blocks within a volume with each sub-request containing the corresponding starting buffer address, starting mass storage block number, and length, before any sub-requests are enqueued for processing.

4. The system of claim 3 where the generated sub-requests are not transferred to the controller until all related requests are available for transfer to the controller enqueued for device processing in a single operation.

5. The system of claim 3 where the mass storage transfer requests created by device drivers from the related sub-requests are grouped into an identified group, and positive action by the controller or mass storage device to process mass storage transfer requests in the identified group is deferred until the entire identified group is received by the mass storage device or controller.

6. A computing system comprising:
a CPU;
random access primary memory (RAM) accessible to the CPU;
a program executing on the CPU;
one or more instruction sequences stored in RAM to be executed by the CPU upon request or sub-request completion;
multiple buffers, each buffer consisting of consecutive random access primary memory locations directly accessible via CPU instructions;
a secondary storage device comprising one or more mass storage devices; and
an operating system configured to initiate data transfers between buffers located in random access primary memory to/from the secondary storage device wherein:
the executing program invokes an operating system service once to enqueue multiple independent program I/O sub-requests, with each independent sub-request containing a sub-request-specific completion address of the first instruction of an instruction sequence to be executed by the CPU upon sub-request completion; and one or more status return locations.

7. The system of claim 6 where each sub-request includes the starting buffer address in random access primary memory, starting block/byte address within a file, volume, or device, and transfer length for a data transfer operation.

8. The system of claim 6 where the independent sub-requests refer to at least one different file, volume, or device.

9. The system of claim 6 where the operating system service allows specification of default values for sub-request device, sub-request I/O function, or sub-request address of the first instruction of an instruction sequence to be executed by the CPU upon individual sub-request completion.

10. A computing system comprising:

a CPU;

random access primary memory (RAM) accessible to the CPU;

a program executing on the CPU;

a secondary storage device comprising one or more mass storage devices;

a buffer consisting of consecutive random access primary memory locations directly accessible via CPU instructions;

an I/O Interface providing a transfer mechanism between the random access primary memory and the secondary storage device;

a mass storage transfer request includes direction, (to/from RAM), a starting address in primary memory, a starting mass storage block number, and a block count;

a controller configured to accept mass storage transfer requests from the I/O interface and control the secondary storage device;

an operating system configured to initiate data transfers between buffers located in random access primary memory to/from the secondary storage device; and one or more device drivers that translate program-issued operating system I/O requests into controller requests transferred via the I/O interface to the controller, wherein:

a program invokes an operating system service to enqueue a program request to initiate mass storage transfer requests between program buffers and the secondary mass storage device; and at least one of the device drivers delays communication of the I/O transfer requests until a specified backlog threshold (measured in blocks or requests has been reached) or a time threshold is reached.

11. A computing system comprising:

a CPU;

random access primary memory (RAM) accessible to the CPU;

a program executing on the CPU;

a buffer consisting of consecutive random access primary memory locations directly accessible via CPU instructions;

a secondary storage device comprising one or more mass storage devices; and one or more device drivers that successively translate program-issued operating system I/O requests into lower-level I/O requests, eventually producing controller requests transferred via the I/O interface to the controller; wherein:

a program invokes an operating system service to enqueue a program request to initiate mass storage transfer requests between program buffers and the secondary mass storage device, the operating system or device driver allocates a contiguous composite data structure located in system-owned random access memory containing structure-specific metadata and multiple operating system I/O requests where the composite data structure contains active/inactive status of the contained individual operating system I/O requests where the composite data structure contains a lock field to coordinate composite data structure access.

12. The system of claim 1 where the sequential device selects media movement mode, (start-stop or streaming), based upon the backlog data received from the device driver.

* * * * *